(12) United States Patent
Wood et al.

(10) Patent No.: US 9,644,447 B2
(45) Date of Patent: May 9, 2017

(54) WIRELINE PRESSURE CONTROL APPARATUS

(71) Applicant: National Oilwell Varco UK Limited, Manchester (GB)

(72) Inventors: Carl Wood, Alford (GB); Runi Joensen, Westhill (GB); Christopher McLaren, Aberdeen (GB); John Craig, Forfar (GB)

(73) Assignee: National Oilwell Varco UK Limited, Manchester (GB)

( * ) Notice: Subject to any disclaimer, the term of this patent is extended or adjusted under 35 U.S.C. 154(b) by 362 days.

(21) Appl. No.: 14/359,150

(22) PCT Filed: Dec. 6, 2012

(86) PCT No.: PCT/GB2012/053030
§ 371 (c)(1),
(2) Date: May 19, 2014

(87) PCT Pub. No.: WO2013/083980
PCT Pub. Date: Jun. 13, 2013

(65) Prior Publication Data
US 2014/0318814 A1    Oct. 30, 2014

(30) Foreign Application Priority Data
Dec. 7, 2011 (GB) .................... 1121008.5

(51) Int. Cl.
*E21B 33/072* (2006.01)
*E21B 17/02* (2006.01)
*F16J 15/18* (2006.01)

(52) U.S. Cl.
CPC .......... *E21B 33/072* (2013.01); *E21B 17/023* (2013.01); *F16J 15/182* (2013.01)

(58) Field of Classification Search
CPC .............................. E21B 33/072; F16J 15/182
See application file for complete search history.

(56) References Cited

U.S. PATENT DOCUMENTS

| 2,132,182 A * | 10/1938 | Nixon ..................... F16J 15/182 |
| | | 277/329 |
| 2,943,682 A * | 7/1960 | Ingram, Jr. ........... E21B 33/072 |
| | | 166/77.1 |
| 4,476,924 A | 10/1984 | Winders et al. |
| 4,821,799 A * | 4/1989 | Wong ....................... F16J 15/40 |
| | | 166/385 |

(Continued)

OTHER PUBLICATIONS

Bellingacci, F., "International Search Report," prepared for PCT/GB2012/053030, as mailed Oct. 30, 2013, 4 pages.

*Primary Examiner* — Shane Bomar
(74) *Attorney, Agent, or Firm* — Winstead PC

(57) ABSTRACT

A wireline pressure control apparatus for use in an oil or gas well, comprising a grease injector having first and second tubes (10) and a bore (12), and a grease injection channel in communication with the bore for injecting grease between the outer surface of the wireline and the inner surface of the bore. The bore (12) has radial passages (15) at spaced apart locations providing a leak path for fluids between the inner surface of the bore and the outer surface of the tubes, allowing pressure to equalize. The radial passages are in fluid communication with one another outwith the bore.

40 Claims, 3 Drawing Sheets

(56) References Cited

U.S. PATENT DOCUMENTS

| | | | |
|---|---|---|---|
| 4,938,290 A * | 7/1990 | Leggett | E21B 33/08 |
| | | | 166/387 |
| 5,133,405 A | 7/1992 | Elliston | |
| 5,301,723 A | 4/1994 | Goode | |
| 5,309,990 A | 5/1994 | Lance | |
| 5,315,831 A | 5/1994 | Goode et al. | |
| 5,360,139 A | 11/1994 | Goode | |
| 5,465,583 A | 11/1995 | Goode | |
| 5,566,764 A | 10/1996 | Elliston | |
| 6,059,029 A | 5/2000 | Goode | |
| 6,173,769 B1 | 1/2001 | Goode | |
| 6,202,764 B1 * | 3/2001 | Ables | E21B 17/025 |
| | | | 166/242.5 |
| 6,216,780 B1 | 4/2001 | Goode et al. | |
| 6,527,215 B1 | 3/2003 | Cain et al. | |
| 6,648,000 B2 | 11/2003 | Cain et al. | |
| 6,672,529 B2 | 1/2004 | Cain et al. | |
| 7,077,209 B2 | 7/2006 | McCulloch et al. | |
| 7,240,726 B2 | 7/2007 | Cain et al. | |
| 7,997,334 B2 * | 8/2011 | McCorry | E21B 33/072 |
| | | | 166/84.1 |
| RE43,410 E | 5/2012 | Goode | |
| 8,544,536 B2 | 10/2013 | McCulloch et al. | |
| RE46,119 E | 8/2016 | Goode | |
| 2006/0102430 A1 * | 5/2006 | Griffioen | H02G 1/086 |
| | | | 184/15.1 |
| 2013/0233571 A1 | 9/2013 | Goddard | |
| 2014/0000865 A1 | 1/2014 | McCulloch et al. | |

\* cited by examiner

WIRELINE PRESSURE CONTROL APPARATUS

This invention relates to a wireline pressure control apparatus for use in an oil or gas well.

Wireline is an established method for conducting downhole operations using single-strand or multi-strand wire or cable, typically for controlling the operation of downhole tools and/or performing other downhole functions in an oil or gas well. Wireline involves the passage of a line from the surface down the wellbore and into the well. Functions of wireline include delivering an item into the hole, e.g. logging tools to measure formation conditions in the hole, retrieving downhole hardware from the hole, and adjusting or operating a valve or other downhole component in the well.

The "wire" can be a plain load-bearing member used for raising and lowering a load, or can be a more complex multi-core member incorporating more than one different type of component, such as axial load bearing members, armour components, and electrical or signal conductors, and protective sheaths. The wire typically passes through a stuffing box and pressure-control equipment accommodating the wire for passage into the well, and sealing the annular area around the wire to contain the wellbore pressure and so enabling wireline operations to be conducted safely on live wellbores. Usually sealing the well involves injecting thick viscous grease around the wire in the pressure control equipment to contain the wellbore pressure below. The grease is typically injected into a grease injection assembly that holds the wire in an axial bore. Longer grease injection assemblies are more effective to contain higher wellbore pressure differentials between the bore and the surface, and typical designs of grease injection assembly involve long stacks of tubes aligned end to end, and their central wire-receiving bores generally have an inner diameter that is only slightly larger than the outer diameter of the wire, providing a very close fit and minimising the annular area around the wire where the grease is injected. The frictional resistance of the very viscous grease is too high for the grease to flow freely in the small annular area, and so the wire can move axially in the tube to perform their function in the well, but the grease resists the blow out of the wellbore fluids past the wire and contains the pressure differential.

Problems arise in grease injection assemblies because of the formation of bubbles in the annular layer of grease surrounding the wire, which is a particular problem with multi-cored braided line which normally has air spaces in its construction. The gas trapped in these air spaces typically expands as the pressure decreases and bubbles of gas tend to escape from the core of the wire, flowing into the grease. Bubbles of gas in the grease dramatically affect the viscous characteristics of the grease, and increased bubble formation can change the grease from a very viscous slow-flowing fluid to a low-viscosity froth, which has much lower frictional characteristics than the viscous fluid form, and is incapable of containing the very high wellbore pressures across the grease injection assembly. Therefore, migration of bubbles into the grease can quickly result in loss of containment, and blow out of the wellbore fluids past the grease. This blow out must be contained above the grease injection assembly by closing a mechanical device to contain the wellbore pressure above the grease injector, stopping wireline operations, and re-injecting fresh viscous grease into the grease injection assembly to displace the bubbled grease and re-establish pressure control. All of this remedial activity requires the cessation of wireline operations and loss of working time while containment is recovered, which on an oil or gas well can be extremely costly. The environmental consequences of blow outs are also unacceptable.

Earlier attempts to address this issue have focussed on filling the air spaces with material that displaces gas from the composite multi-core wireline arrangements during construction of the wire, so that the gas is not retained in the wire and so cannot escape into the grease in use.

According to the present invention there is provided wireline pressure control apparatus for use in an oil or gas well, comprising a grease injector having first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the bore having a plurality of radial passages through the tubes, at spaced apart locations along the bore, the radial passages being in fluid communication with the bore and providing a leak path for fluids between the inner surface of the bore and the outer surface of the tubes, thereby allowing pressure to equalise between the bore and the outside of the tubes at the spaced locations of the radial passages;

wherein the radial passages are in fluid communication with one another outwith the bore.

Typically the tubes are arranged end to end, wherein the bore in each tube is sealed to the bore in at least one adjacent tube, providing a continuous sealed bore extending between the tubes.

Typically each tube has at least one respective radial passage. Optionally each tube can have more than one radial passage, typically 3, 4 or more. Optionally the radial passages can be grouped together, and optionally can be arranged parallel to one another. Optionally the radial passage(s) can extend radially and axially with respect to the bore of the tube, and can optionally emerge on the outer surface of the tube at an aperture that is axially and radially spaced with respect to the aperture on the inner surface of the tube. Providing the radial passage(s) with an axial component as well as a radial component so that the passages extend axially for a certain distance means that a pressure differential can optionally be applied across the radial passages when the apparatus is in use. For example, typically the apparatus is intended to contain a wellbore pressure below the apparatus in the well, and in such cases, the inlet aperture of the radial passage on the inner surface of the tube is typically spaced axially below the outlet aperture of the passage on the outer surface of the tube. In some cases, the radial passage(s) can extend generally diagonally with respect to the bore.

Typically the passages extend in generally straight lines through the wall of the tubes. Optionally the radial passages can be generally perpendicular to the bore of the tubes.

The radial passages typically define the locations along the tubes that allow equalisation of pressure. Typically the radial passages form part of an alternative fluid pathway providing an alternative route for fluids instead of passing through the bore of the tube.

Typically the alternative fluid pathway through the radial passages and the interconnection between their outer ends provides a leak path having a differential (e.g. lower) resistance to the passage of lower viscosity fluids (e.g. bubbles) than the resistance presented by the alternative pathway to the flow of higher viscosity fluids (e.g. liquid grease), so that lower viscosity fluids pass through the alternative flow path more easily than higher viscosity fluids.

Typically the main fluid pathway through the bore of the flow tubes, which is normally filled with highly viscous liquid grease, has a higher resistance to the passage of low viscosity fluids as compared with the resistance to the flow of low viscosity fluids passing through the alternative fluid pathway formed by the radial passages and the interconnections between them. The radial passages therefore typically allow bubbles within the tubes to escape preferentially through a lower resistance pathway to less viscous fluids in the annular space between the tubes and the sleeve.

Optionally the radial passages emerge on the outside wall of the tubes at or near an end of each tube, typically in the region of a connector between two adjacent tubes. Typically a pressure drop between one tube and the next draws the bubbles emerging from the radial passages near the top of the first tube into the annulus outside the second tube.

The differential in resistance between high and low viscosity fluids is typically achieved by manipulating the shear stress that is generated in the fluid pathways of the device.

Typically a sleeve surrounds the tubes, and the radial passages connect the co-axial bores of the tubes with the annulus between the sleeve and the tubes. Typically each tube has a respective sleeve, and the sleeves on adjacent tubes are typically connected to one another to maintain fluid communication between the radial passages in the annular area between adjacent tubes and adjacent sleeves.

Typically fluid passing through and between the radial passages encounters higher shear stress than the same fluid would encounter passing through the bore. Typically highly viscous fluids therefore pass more easily through the bore than through the radial passages and the fluid connections between them. Optionally the resistance to flow of fluid through the radial passages themselves is significantly higher than the resistance in the bore, typically because the radial passages have a generally uniform inner diameter that is less (typically significantly less) than the diameter of the bore accommodating the wireline. In certain embodiments, the radial passages can incorporate a flow restrictor.

In certain embodiments, the interconnection between adjacent radial passages can incorporate a flow restrictor. Optionally the flow restrictor in the interconnection can be an unsealed flowpath in the annular area between the sleeve and the tubes.

Typically the ratio of the overall surface area of the pathway to volume of the flowpath in the bore is different from the ratio of overall surface area to volume in the flowpath connecting the outer ends of the radial passages. In the flowpath connecting the outer ends of the radial passages, the flowpath (typically formed as an annular gap extending outside the flow tubes) typically has a relatively low volume, but the surface area of the flowpath can optionally be relatively high as the annular flowpath typically has a large radius with a small clearance between the inner surface of the sleeve and the outer surface of the tube. Optionally the flow restriction provided by the small clearance between the sleeve and the tube can extend axially along the assembly for different distances in order to vary the shear stress of fluid in the annular fluid pathway. For example, the flow restrictor with the small clearance area can be extended to generate high shear stresses in the fluids passing through it. Therefore, highly viscous fluids would encounter very large shear stresses in the outer pathway, and essentially are filtered out and are forced to route through the main bore of the tubes, whereas less viscous fluids encounter lower shear stresses in the radial passages and the interconnection between them, and can pass more easily through the annular pathway outside the flow tubes. Within the flow tube the volume of the flow path for the grease between the wire and the inner surface of the flow tube is substantially larger but the surface area of the flow tube is typically relatively smaller. Hence the surface area:volume ratio for the tube pathway is typically different from the surface area:volume ratio of the annular flowpath connecting the outer ends of the radial passages. Therefore, highly viscous fluids passing through the bore of the flow tube experience lower shear stress than highly viscous fluids passing through the high shear flowpath connecting the outer ends of the radial passages. Viscous fluids like un-frothed grease generally cannot easily flow in high shear stress environments and so liquid grease tends to preferentially flow through the flow tube pathway, where the shear stress generated is relatively low, whereas gas bubbles in the grease can flow in relatively higher shear stress conditions, and so will flow readily through the radial passages and through the small annular gaps connecting the outer ends of the radial passages. The radial passages therefore provide a leak path that automatically captures the more mobile gas bubbles in the grease, allowing it to be bled out of the flow tube, and restricts the passage of un-frothed grease, retaining it within the flow tube and reducing losses of high integrity grease that is not frothed.

Therefore, typically shear stress experienced by frothed grease passing through the pathway between the radial passages can be less (typically substantially less) than the shear stress experienced by liquid un-frothed grease fluid passing through the bore of the tube, whereby grease in liquid form flows preferentially through the bore of the tube rather than through the interconnection between the outer ends of the radial passages. Because of the lower surface area of the interconnection, and resultant higher shear stress, un-frothed grease having substantially no bubbles cannot easily leave the bore of the flow tube, and if it does, it cannot easily flow through the flow restrictor in the interconnection. By contrast, bubbled or frothed grease has a lower viscosity than the un-frothed grease, and so can leave the bore of the flow tube more easily than the liquid un-frothed grease, and can also pass through the interconnection more easily than the un-frothed grease. Therefore, a preferential flow path for the un-frothed grease is provided, which facilitates separation of frothed from un-frothed grease in the flow tube, diverts the frothed grease away from the wire, and maintains the grease in contact with the wire in a more consistent state with fewer air bubbles.

Optionally the flowpath (e.g. the annulus) connecting the outer ends of the radial passages can have a higher volume than the bore of the tubes, typically significantly higher volume. Typically the flowpath presents lower resistance to gas bubbles than to liquids.

The invention also provides a method of controlling pressure around a wireline in grease injector of an oil or gas well, wherein the grease injector comprises first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the method comprising providing a plurality of radial passages through the tubes, at spaced apart locations along the bore, the radial passages being in fluid communication with the bore and allowing leakage of fluids through the radial passages from the inner surface of the bore to the outer surface of the tubes, thereby allowing pressure to equalise between the bore and the outside of the tubes at the spaced locations of the radial passages; and allowing fluid communication between radial passages outwith the bore.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising" "having," "containing," or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or is preceding the recitation of the composition, element or group of elements and vice versa.

All numerical values in this disclosure are understood as being modified by "about". All singular forms of elements, or any other components described herein are understood to include plural forms thereof and vice versa.

Figure 1:
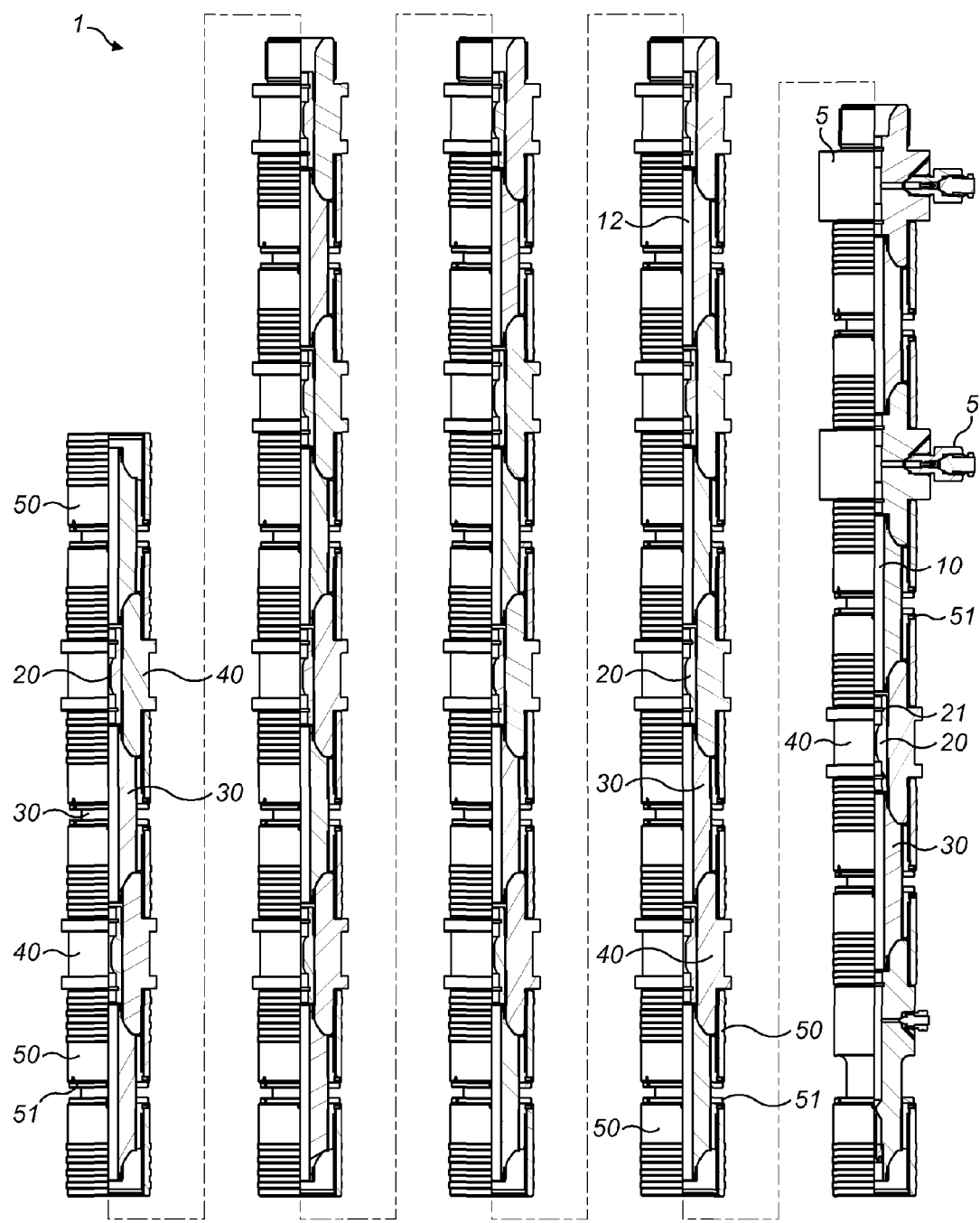
FIG. 1 is a side view and partial section of a grease injection assembly incorporating apparatus according to the invention.

Referring now to the drawings, a grease injection assembly 1 typically comprises a modular structure comprising a stack of end to end flow tubes having internal bores that are arranged co-axially to form a central bore for the passage of wireline through the flow tubes. The bore for receiving the wireline is typically a close tolerance bore which is only very slightly larger than the wireline it is intended to receive, in the order of a few percent larger in diameter, so that the wire is tightly received within the bore of the flow tubes, and the diameter of the annular space between the outer surface of the wire and the inner surface of the flow tube is very small, typically of the order of 0.1-0.2 mm.

Figure 2:
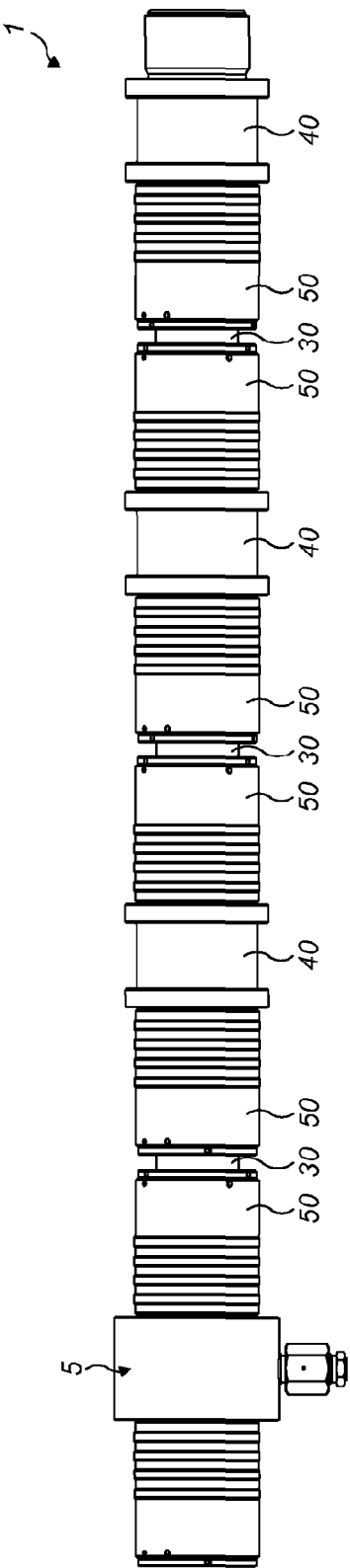
FIG. 2 is a side view of a part of the grease injection assembly of FIG. 1.
Figure 3:
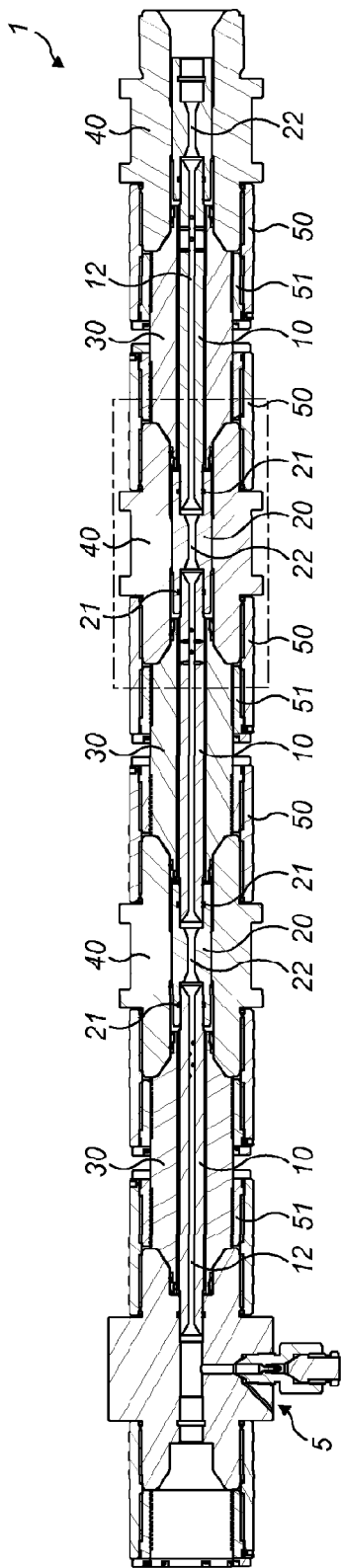
FIG. 3 is a section through FIG. 2.
Figure 3:
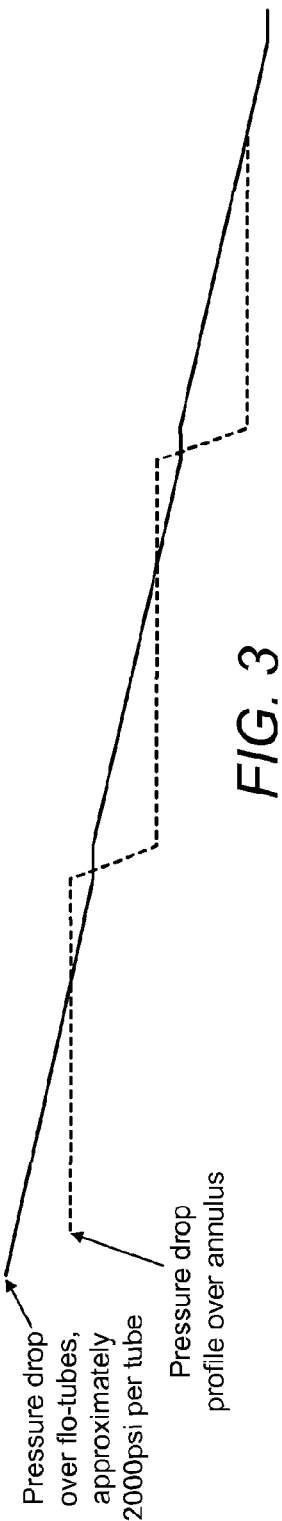

Referring now to FIGS. 2 and 3, the tube carrying the wireline in this example comprises a number of flow tubes 10 arranged end-to-end and having their adjacent ends coupled by flow tube couplers 20. The flow tube couplers 20 typically have axial sockets at each end adapted to receive adjacent ends of respective flow tubes 10, and the sockets have seals, typically in the form of O-rings 21 which seal between the inner surface of the socket and the outer surface of the flow tube, but other types of seal can be used with other embodiments. The sockets at each end of the flow tube coupler 20 are connected by a central passage 22, which connects the bores of the flow tubes 10 above and below the couplers 20, thereby forming a continuous sealed bore along the axis of the flow tube 10 to receive and to seal the wireline.

A grease injector 5 is provided at the bottom end of the grease injection assembly 1, and injects grease into the annulus between the wireline and the inner surface of the bore of the flow tube 10. Wellbore pressure below the grease injector forces the grease up the annulus.

Surrounding the stack of flow tubes 10 and couplers 20, the grease injection assembly 1 has a sleeve formed by sleeve elements 30 coupled by sleeve couplers 40 which surround the stack of flow tubes 10 and flow tube couplers 20. The sleeve elements 30 are typically formed as tubular sleeves having a central bore that is adapted to receive the flow tubes 10. Adjacent sleeve elements 30 are arranged to be connected to one another by sleeve couplers 40, and typically have sloping head and shoulders at upper and lower ends of the sleeve elements 30, which cooperate with correspondingly angled shoulders on the ends of the sleeve couplers 40 in order to locate sealing elements and form a seal. Typically the sleeve couplers 40 are connected to the upper and lower ends of the sleeve elements 30 by collars 50.

The sleeve couplers 40 have internal bores that receive the flow tube couplers 20. Typically the internal bore of the sleeve couplers 40 is slightly wider than the internal bore of the sleeve elements 30 in order to accommodate the slightly larger diameter flow tube couplers 20. Typically the internal bore of the sleeve couplers 40 has a radially inwardly extending step 41 that butts against the outer surface of the flow tube coupler 20, forming a close fit with the outer surface of the flow tube coupler 20, which is typically tightly received within the radial shoulder. Beyond the radial shoulder in an axial direction, the tolerance between the inner diameter of the bore through the sleeve coupler 40 and the outer diameter of the flow tube coupler 20 can be less precise.

Typically the sleeve coupler 40 connects adjacent ends of respective sleeve elements 30 in the same way that the flow tube couplers 20 connect adjacent ends of the flow tubes 10. Typically the sleeve couplers 40 are sealingly connected to the sleeve elements 30, but are not sealingly connected to the flow tubes 10 or the flow tube couplers 20. Typically the sleeve couplers 40 are placed over the sloped shoulders of the sleeve elements 30 so that the narrow upper (or lower)

end of the sleeve element 30 is received within the bore of the sleeve coupler 40, and typically an O-ring or other seal (which could be of any design, e.g. elastomeric or metal etc.) is provided between the sleeve element 30 and the sleeve coupler 40 at this point. A mechanical connection between the sleeve element 30 and the sleeve coupler 40 is provided by a collar 50 and collar insert 51. Typically the collar insert 51 is formed into (or more) shells, and has a pattern on its inner surface (e.g. concentric rings) that mates with a corresponding pattern on the outer surface of the sleeve element 30. The patterns on the inner surfaces of the collar inserts 51 are typically engaged with the patterns on the outer surfaces of the sleeve elements 30, and the collars 50 are then screwed over the outer surface of the collar inserts 51, and typically sealed and/or typically held in place against rotation by a grub screw or other retaining pin etc. Thus, the stack of sleeve elements 30 and sleeve couplers 40 forms a continuous conduit which has a central bore that receives the stack of flow tubes 10 and flow tube couplers 20 within that bore. Typically the sleeve stack formed by the sleeve elements 30 and sleeve couplers 40 is sealed preventing fluid escape from its bore. Thus, an annulus is formed between the outer surface of the stack of flow tubes 10 and flow tube couplers 20 and the inner surface of the bore in the sleeve stack made up of the sleeve elements 30 and sleeve couplers 40. Typically the annulus has restrictions to flow formed by the radially inward extending shoulders in the sleeve couplers 40. Typically apart from this flow restriction, there is no absolute seal provided in the annulus, and the annulus is in fluid communication between the top and the bottom of the grease injection assembly as is the bore in the centre of the flow tubes 10 and flow tube couplers 20.

The central bore 12 in the middle of the flow tubes 10 cooperates with the bore 22 through the flow tube couplers to create a continuous bore for receiving the wireline extending from the bottom of the grease injection assembly to the top. This bore 12, 22 is filled with grease from the grease injector 5 when the wireline is in place. The grease injected through the grease injector 5 retains wellbore pressure below the grease injection assembly 1.

Figure 4:
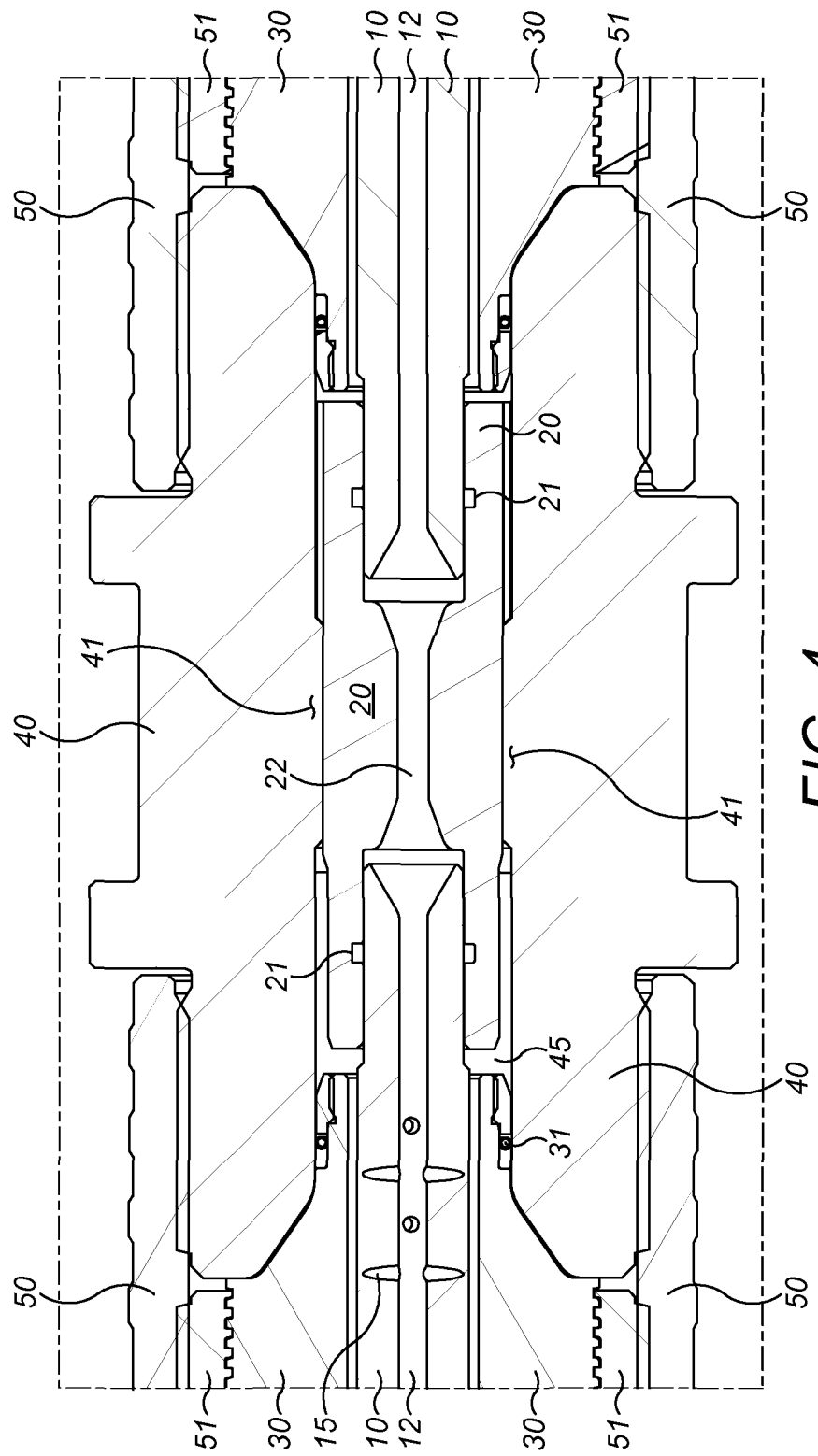
FIG. 4 is a schematic view showing the main flow paths for grease in the apparatus of FIGS. 1 to 3.

The bore 12 has a plurality of radial passages 15 (best seen in FIG. 4).

FIG. 4 shows an enlarged view of the portion of FIG. 3 in dotted lines. This shows the flow restriction created by the inwardly extending shoulder 41 on the inner bore of the sleeve coupler 41, and the seals 31 between the sleeve element 30 and the sleeve coupler 40.

As shown in FIG. 4, the radially extending passages 15 through the walls of the flow tubes 10 are provided in each respective flow tube 10, typically near the upper end of the flow tube 10 before the upper end of the flow tube 10 extends into the socket of the flow tube coupler 20. Typically a number of radial passages are provided, for example, in the FIG. 4 embodiment, 8 passages 15 are provided at the top of the flow tube 10. In the embodiment shown in FIG. 4, the radial passages 15 extend generally perpendicularly to the axis of the bore 12 through the flow tube 10, but in other embodiments, the radial passages are typically angled with respect to the axis of the bore 12, so that the inner end of the radial passage communicating with the bore 12 is below the outer end of the radial passage that communicates with the annulus. Optionally each tube can have a different number of radial passages, typically at least one, but optionally 2, 3, 4 or more. Typically fluid passing through the radial passages 15 encounters higher resistance to fluid flow than fluid passing through the bore 12.

Grease injected through the grease injector 5 around the wireline and the bore 12 travels up in the annulus between the wireline and the bore 12. Any bubbles that form within the grease are typically more mobile than the un-frothed grease remaining in the bore 12, and the radial passages 15 typically provide a preferential escape path for the frothed bubbles of grease, which pass radially through the wall of the flow tube 10, via the radial passages 15, from the bore 12 into the annular area 45 between the outer surface of the flow tube stack and the inner surface of the sleeve stack. The annulus typically varies in size, with the annular area at some axial locations being relatively wide and offering very little resistance to fluid flow, and in other axial locations, for example in the much smaller annular area created between the radial projection 41 on the inner surface of the sleeve coupler 40 and the outer surface of the flow tube coupler 20, the annular flowpath can be relatively narrow, but typically the annulus 45 is never completely sealed to fluid flow along the axial length of the assembly. Therefore, bubbles of grease escaping from the inner bore 12 of the flow tube 10 typically flow upwards along the annulus 45. The low viscosity, highly mobile grease bubbles typically pass relatively easily through the flow restriction created by the radially inwardly extending shoulder 41, extending between the inner surface of the sleeve coupler 40 and the outer surface of the flow tube coupler 20. However, high integrity grease that is not frothed cannot easily pass radially out of the bore 12 of the flow tube 10 and if it does, it cannot pass the flow restriction 41, due to the higher shear stresses that it encounters in that annular flow path, and so the annular flow path created in the annulus between the sleeve stack 30, 40 and the flow tube stack 10, 20 typically preferentially allows the flow of low viscosity bubbles of grease, and restricts the flow of high viscosity high integrity liquid grease that is substantially free from bubbles, because of the difference in viscosity between frothed and un-frothed grease and the effect that this has on the shear stress encountered by the fluids passing through the annular flow path. Optionally the axial distance of the flow restriction 41 can be varied in order to make the annular flow path longer or shorter as desired. Longer axial flow paths in the annulus 45 typically generate higher shear stresses in the fluids passing through them, so this feature can optionally be varied in different embodiments of the invention in order to generate higher shear stress and higher resistance with longer annular flowpaths, and lower shear stress and lower resistance with shorter annular flowpaths.

The graph underneath FIG. 3 shows the pressure drop over the flow tubes with decreasing depths. In FIG. 3, the left hand end is typically below the right hand end, and is exposed to full wellbore pressure beneath the grease injection assembly 1. As depth decreases from left to right, the pressure within the bore 12 of the flow tube 10 drops in accordance with the solid line beneath FIG. 3. However, the pressure drop in the annulus is less linear and more stepped as shown in the dotted line below FIG. 3. Pressure equalizes between the annulus 45 and the bore 12 in the areas adjacent to and typically slightly above the axial location of the radial passages 15, so typically the lower flow tubes 10 in the grease injection assembly 1 experience higher pressure drops than the upper ones. The step wise pressure drop causes the bubbles of grease in the tubes 10 to surge out of the radial passages 15 at the tops of the tubes, and the pressure drop between adjacent tubes 10 propels the frothed grease up the annular flow path and the annulus 45 between the sleeve stack 30, 40 and the flow tube stack 10, 20, from one tube 10 to the next. The low integrity frothed grease is therefore swept up the annular flowpath can be removed from the system through a bleed valve typically located at the top of the grease injection assembly 1, or otherwise captured or treated, thereby separating the less useful low integrity frothed grease from the more useful high integrity un-frothed grease, maintaining the wireline in the bore within a coating of grease with high integrity, which is substantially free from bubbles.

The invention claimed is:

1. Wireline pressure control apparatus for use in an oil or gas well, comprising a grease injector having first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

wherein the tubes are arranged end to end, wherein the bore in each tube is sealed to the bore in at least one adjacent tube, providing a continuous sealed bore extending between the tubes, and wherein each tube has at least one respective radial passage, the bore having a plurality of radial passages through the tubes, at spaced apart locations along the bore, the radial passages being in fluid communication with the bore and providing a leak path for fluids between the inner surface of the bore and the outer surface of the tubes, thereby allowing pressure to equalise between the bore and the outside of the tubes at the spaced locations of the radial passages; and wherein the radial passages are in fluid communication with one another outwith the bore.

2. Apparatus as claimed in claim 1, wherein each tube has more than one radial passage, and wherein the radial passages in each tube are grouped together at the same location on each tube with respect to the axis of the bore.

3. Apparatus as claimed in claim 1, wherein the radial passages connect an inlet on the inner surface of a tube with an outlet on the outer surface of the tube, and wherein the radial passages extend radially and axially with respect to the bore, whereby the outlet is axially and radially spaced along the bore of the tube with respect to the inlet.

4. Apparatus as claimed in claim 1, wherein the radial passages permit the escape of pressurised fluids from the bore of the tubes via a fluid pathway that bypasses the bore of the tubes connecting the inner ends of the radial passages.

5. Apparatus as claimed in claim 4, wherein the fluid pathway preferentially allows the escape of bubbles from the bore of the tubes.

6. Apparatus as claimed in claim 4, wherein the fluid pathway is configured to present a lower resistance to the passage of low viscosity fluids as compared with the resistance to the flow of high viscosity fluids passing through the fluid pathway.

7. Apparatus as claimed in claim 6, wherein the fluid pathway is configured to generate different shear stresses in fluids of different viscosity passing through the fluid pathway, and wherein the differential in resistance between high and low viscosity fluids is achieved by selecting the dimensions of the fluid pathway to induce a differential shear stress in the fluid.

8. Apparatus as claimed in claim 6, wherein a shear stress that is induced in liquid un-frothed grease passing through the bore of the tubes is less than a shear stress that is experienced by liquid un-frothed grease passing through the fluid pathway, whereby liquid grease flows preferentially through the bore of the tube rather than through the fluid pathway.

9. Apparatus as claimed in claim 1, wherein un-frothed grease having substantially no bubbles is retained in the bore of the flow tube, and frothed grease is diverted into the radial passages, away from the bore.

10. Apparatus as claimed in claim 1, wherein the leak path incorporates at least one flow restrictor.

11. Apparatus as claimed in claim 1, wherein a flow restrictor is incorporated in an interconnection between adjacent radial passages.

12. Apparatus as claimed in claim 1, wherein a first ratio of surface area:volume of the bore of the tubes is lower than a second ratio of surface area:volume of the leak path.

13. Apparatus as claimed in claim 1, wherein a sleeve surrounds the tubes and defines an annular area between the sleeve and the tubes, and the radial passages connect the co-axial bores of the tubes with the annular area between the sleeve and the tubes.

14. Apparatus as claimed in claim 13, wherein each tube has a respective sleeve, and the sleeves on adjacent tubes are connected to one another to maintain fluid communication between the radial passages in the annular area between adjacent tubes and adjacent sleeves.

15. Apparatus as claimed in claim 13, wherein the leak path connecting the outer ends of the radial passages is formed as an annular gap extending between the sleeve and the flow tubes, with a higher surface area:volume ratio than the corresponding ratio for the flowpath through the bore of the tubes.

16. Apparatus as claimed in claim 15, wherein the leak path incorporates a small annular clearance between the sleeve and the tube which extends axially along the assembly.

17. Apparatus as claimed in claim 16, wherein the small annular clearance between the sleeve and tube provides an unsealed annular flowpath between the sleeve and the tubes, and wherein the unsealed annular flowpath restricts the flow of high viscosity fluids within the annulus.

18. Apparatus as claimed in claim 1, wherein the leak path connecting the outer ends of the radial passages has an overall volume that is higher than the volume of the flowpath formed by bore of the tubes.

19. Apparatus as claimed in claim 1, wherein the radial passages emerge on the outside wall of the tubes at or near an end of each tube, in the region of a junction between two adjacent tubes, and wherein a pressure drop between the two tubes draws bubbles emerging from the radial passages near the top of the first tube into an annulus outside the second tube.

20. A method of controlling pressure around a wireline in a grease injector of an oil or gas well, wherein the grease injector comprises first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the method comprising:
arranging the tubes end to end, and sealing the bore in each tube to the bore in at least one adjacent tube such that a continuous sealed bore extends between the tubes, wherein each tube has at least one respective radial passage;

providing a plurality of radial passages through the tubes, at spaced apart locations along the bore, the radial passages being in fluid communication with the bore;

allowing leakage of fluids through the radial passages from the inner surface of the bore to the outer surface of the tubes, thereby allowing pressure to equalise between the bore and the outside of the tubes at the spaced locations of the radial passages; and allowing fluid communication between radial passages outwith the bore.

21. A method according to claim 20, including permitting the escape of pressurised fluids from the bore of the tubes via a pathway that bypasses the bore of the tubes connecting the inner ends of the radial passages.

22. A method as claimed in claim 20, including resisting fluid flow to different extents in the fluid leak path comprising the radial passages and the fluid passing through the bore of the tubes.

23. A method as claimed in claim 20, including diverting lower viscosity fluids through the fluid leak path comprising the radial passages and diverting higher viscosity fluids through the bore of the tubes.

24. A method as claimed in claim 20, including diverting bubbles through the fluid leak path comprising the radial rather than through the bore of the tubes.

25. A method as claimed in claim 20, including inducing different shear stresses in different viscosities of fluid flowing in the fluid leak path comprising the radial passages.

26. A method as claimed in claim 25, including selecting the dimensions of the fluid leak path comprising the radial passages to induce an appropriate shear stress in the fluid leaking through said leak path.

27. A method as claimed in claim 25, including inducing lower shear stress in liquid un-frothed grease passing through the bore of the tubes than the shear stress experienced by liquid un-frothed grease passing through the leak path comprising the radial passages.

28. A method as claimed in claim 20, including flowing liquid un-frothed grease through the bore of the tube rather than through the leak path comprising the radial passages.

29. A method as claimed in claim 20, including retaining un-frothed grease having substantially no bubbles in the bore of the flow tube, and diverting frothed grease away from the bore.

30. A method as claimed in claim 20, including presenting a lower resistance to the passage of low viscosity fluids through the leak path comprising the radial passages as compared with the resistance to the flow of high viscosity fluids passing through the same pathway.

31. A method as claimed in claim 20, including connecting the outer ends of the radial passages by an annular flowpath formed by a sleeve surrounding the tubes and defines the annular flowpath between the sleeve and the tubes, and connecting the co-axial bores of the tubes with the annular flowpath via the radial passages.

32. A method as claimed in claim 31, wherein the annular flowpath incorporates a fluid restriction comprising a small annular clearance between the sleeve and the tube, which restricts the flow of high viscosity fluids within the annular flowpath, and wherein the method includes generating higher shear stresses in the fluids passing through the small annular clearance than in the other portions of the annular flowpath.

33. A method as claimed in claim 20, wherein the radial passages emerge on the outside wall of the tubes at or near an end of each tube, in the region of a junction between two adjacent tubes, and wherein the method includes inducing a pressure drop between the two tubes and drawing the bubbles emerging from the radial passages near the top of the first tube into an annulus outside the second tube.

34. A method as claimed in claim 33, wherein the pressure drop is non-linear along the annular flowpath.

35. A method as claimed in claim 34, wherein the pressure drop in the fluid is more linear along the bore of the tubes than along the annular flowpath.

36. Wireline pressure control apparatus for use in an oil or gas well, comprising a grease injector having first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the bore having a plurality of radial passages through the tubes, at spaced apart locations along the bore, the radial passages being in fluid communication with the bore and providing a leak path for fluids between the inner surface of the bore and the outer surface of the tubes, thereby allowing pressure to equalise between the bore and the outside of the tubes at the spaced locations of the radial passages;

wherein a sleeve surrounds the tubes and defines an annular area between the sleeve and the tubes, and the radial passages connect the co-axial bores of the tubes with the annular area between the sleeve and the tubes;

wherein each tube has a respective sleeve, and the sleeves on adjacent tubes are connected to one another to maintain fluid communication between the radial passages in the annular area between adjacent tubes and adjacent sleeves; and wherein the outer ends of the radial passages opening into the annular area are interconnected in fluid communication with one another outwith the bore.

37. Wireline pressure control apparatus for use in an oil or gas well, comprising a grease injector having first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the bore having a plurality of radial passages through the tubes, at spaced apart locations along the bore;

wherein a sleeve surrounds the tubes and defines an annular area between the sleeve and the tubes, and the radial passages connect the co-axial bored of the tubes with the annular area between the sleeve and the tubes;

the radial passages being in fluid communication with the bore and providing a leak path for fluids between the inner surface of the bore and the outer surface of the tubes, thereby allowing pressure to equalise between the bore and the annular area outside the tubes at the spaced locations of the radial passages; and wherein the outer ends of the radial passages opening into the annular area are interconnected in fluid communication with one another by the annular area, wherein the annular area interconnecting the outer ends of the radial passages incorporates a fluid flow restrictor between adjacent radial passages which has a higher surface:volume ratio than the corresponding ratio for the flowpath through the bore of the tube.

38. Apparatus as claimed in claim 1, wherein the annular area is in fluid communication between the top and the bottom of the grease injector.

39. A method of controlling pressure around a wireline in a grease injector of an oil or gas well, wherein the grease injector comprises first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the method comprising:
providing a plurality of radial passages through the tubes, at spaced apart locations along the bore, the radial passages being in fluid communication with the bore;
surrounding the tubes with a sleeve and defining an annular area between the sleeve and the tubes, such that the radial passages connect the co-axial bores of the tubes with the annular area between the sleeve and the tubes;
providing each tube with a respective sleeve, and connecting the sleeves on adjacent tubes to one another, thereby maintaining fluid communication between the radial passages in the annular area between adjacent tubes and adjacent sleeves;
allowing leakage of fluids through the radial passages from the inner surface of the bore to the outer surface of the tubes, thereby allowing pressure to equalise between the bore and the outside of the tubes at the spaced locations of the radial passages; and
allowing fluid communication between radial passages outwith the bore.

40. A method of controlling pressure around a wireline in a grease injector of an oil or gas well, wherein the grease injector comprises first and second tubes arranged co-axially and having a bore for passage of the wireline through the tubes and into the well, and a grease injection channel in communication with the bore of the tubes for injecting grease into the bore between the outer surface of the wireline and the inner surface of the bore when the wireline is disposed in the tubes;

the method comprising:
providing a plurality of radial passages through the tubes, at spaced apart locations along the bore, the radial passages being in fluid communication with the bore;
surrounding the tubes with a sleeve and defining an annular area between the sleeve and the tubes, such that the radial passages connect the co-axial bores of the tubes with the annular area between the sleeve and the tubes,
allowing leakage of fluids through the radial passages from the inner surface of the bore to the outer surface of the tubes, thereby allowing pressure to equalise between the bore and the annular area outside the tubes at the spaced locations of the radial passages;
allowing fluid communication between the outer ends of the radial passages opening into the annular area outwith the bore; and
restricting the flow of fluid within the annular area by locating a fluid flow restrictor between the outer ends of adjacent radial passages such that the surface area:volume ratio of the flow restriction is higher than the corresponding ratio for the flowpath through the bore of the tubes.

* * * * *

UNITED STATES PATENT AND TRADEMARK OFFICE
CERTIFICATE OF CORRECTION

PATENT NO. : 9,644,447 B2
APPLICATION NO. : 14/359150
DATED : May 9, 2017
INVENTOR(S) : Carl Wood et al.

It is certified that error appears in the above-identified patent and that said Letters Patent is hereby corrected as shown below:

In the Claims

Column 12, Lines 1-2, Replace "between the two tubes and drawing the bubbles emerging" with
Claim 33 -- between the two tubes and drawing bubbles emerging --

Signed and Sealed this
First Day of August, 2017

Joseph Matal
*Performing the Functions and Duties of the
Under Secretary of Commerce for Intellectual Property and
Director of the United States Patent and Trademark Office*